United States Patent [19]

Yoneyama

[11] Patent Number: 5,325,234
[45] Date of Patent: Jun. 28, 1994

[54] TELEPHOTO LENS SYSTEM
[75] Inventor: Shuji Yoneyama, Tokyo, Japan
[73] Assignee: Asahi Kogaku Kogyo Kabushiki Kaisha, Tokyo, Japan
[21] Appl. No.: 44,470
[22] Filed: Apr. 9, 1993
[30] Foreign Application Priority Data
Apr. 16, 1992 [JP] Japan .................. 4-96803
[51] Int. Cl.$^5$ .................. G02B 15/14; G02B 9/14; G02B 13/02
[52] U.S. Cl. .................. 359/684; 359/745; 359/748
[58] Field of Search .................. 359/748, 746, 745, 684
[56] References Cited

U.S. PATENT DOCUMENTS

| | | | |
|---|---|---|---|
| 4,176,913 | 12/1979 | Nakamura et al. | 359/746 |
| 4,437,734 | 3/1984 | Iizuka | 359/745 |
| 4,610,514 | 9/1986 | Nakamura | 359/746 |
| 4,666,260 | 5/1987 | Itoh | 359/745 |
| 4,852,984 | 8/1989 | Takahashi et al. | 359/748 |
| 4,874,231 | 10/1989 | Aono | 359/684 |

FOREIGN PATENT DOCUMENTS

| | | | |
|---|---|---|---|
| 56-165110 | 12/1981 | Japan . | |
| 0027115 | 2/1983 | Japan | 359/748 |
| 59-17519 | 1/1984 | Japan . | |
| 62-235914 | 10/1987 | Japan . | |
| 0089813 | 4/1988 | Japan | 359/746 |

Primary Examiner—Loha Ben
Assistant Examiner—Evelyn A. Lester
Attorney, Agent, or Firm—Sughrue, Mion, Zinn, Macpeak & Seas

[57] ABSTRACT

A telephoto lens system that adopts an inner focusing method and that is capable of satisfactory correction of aberrations while insuring an adequate back focus without increasing the overall lens length. The present telephoto lens system comprises, in order from the object side, a positive first lens group, a negative second lens group and a positive third lens group. The system can be focused on a close-up object by moving the second lens group toward the image. The first lens group comprises a positive first sub-group 1a and a positive second sub-group 1b separated from the first sub-group airspace. The system satisfies the following conditions:

(1) $1.4 < f/f_1 < 2.0$

(2) $-3.5 < f/f_2 < -2.5$ (3) $0.4 < f/f_{1b} < 1.0$ (4) $0.1 < d_{1ab}/f_1 < 0.3$ where f is the focal length of the overall system; $f_1$ is the focal length of the first lens group; $f_2$ is the focal length of the second lens group; $f_{1b}$ is the focal length of the sub-group 1b; and $d_{1ab}$ is the distance between the sub-groups 1a and 1b.

9 Claims, 6 Drawing Sheets

TELEPHOTO LENS SYSTEM

This application is based on and claims priority from Japanese Application No. HEI-4-96803 filed Apr. 16, 1992, the disclosure of which is incorporated herein by reference.

BACKGROUND OF THE INVENTION

The present invention relates to a telephoto lens system of the inner focal type that is suitable for use with photographic cameras.

Large-aperture and telephoto type lenses are too heavy to handle easily, particularly when the lens system is advanced to a forward position. To avoid this problem, Japanese Patent Laid-Open Publication Nos. SHO 56-165110, 59-17519 and 62-235914, have proposed the use of inner focusing to achieve advanced lens positions.

However, the above-noted conventional lens systems experience large aberrational variations that occur when shooting objects at close range. These aberrations have been partly eliminated by the lens system described in Japanese Patent Laid-Open Publication No. SHO 62-235914. However, this system still experiences a disadvantageously short back focus or back focal length.

When using a telephoto lens system of the type used in the present invention, a rear conversion lens may be attached between the lens system and the camera body to increase the composite focal length. When this rear conversion lens is used, a longer back focus permits more satisfactory correction of the aberrations than offered in the overall system including in the rear conversion lens.

SUMMARY OF THE INVENTION

An object of the present invention is to provide a telephoto type lens system that utilizes an inner focusing method and that satisfactorily corrects aberrations.

Another object of the present invention is to insure an adequate back focus without increasing the overall lens length.

To attain the above objectives, the present invention provides a telephoto lens system comprising, in order from the object side, a positive first lens group, a negative second lens group and a positive third lens group, wherein the system can focus on objects by moving the second lens group. The present lens system is characterized in that the first lens group comprises a first positive sub-group 1a and a second positive sub-group 1b separated from the first sub-group by an airspace. The present invention also satisfies the following conditions:

(1) $1.4 < f/f_1 < 2.0$ (2) $-3.5 < f/f_2 < -2.5$ (3) $0.4 < f/f_{1b} < 1.0$ (4) $0.1 < d_{1ab}/f_1 < 0.3$ where f is the focal length of the overall system; $f_1$ is the focal length of the first lens group; $f_2$ is the focal length of the second lens group; $f_{1b}$ the focal length of the sub-group 1b; and $d_{1ab}$ is the distance between the sub-groups 1a and 1b. The lens system can focus on the object on objects at closer range by moving the second lens group toward the image.

DETAILED DESCRIPTION OF THE PREFERRED EMBODIMENTS

Embodiments of the present invention are described below. The structure of these embodiments is configured to satisfy the condition set forth above in the "Summary of the Invention" for reasons explained hereafter.

In order to insure a comparatively long back focus while keeping the overall lens length from unduly increasing, the present telephoto lens system distributes the power between the first and second lens groups in accordance with conditions (1) and (2) set forth above. Increasing the power of the first lens group shortens the overall lens length. At the same time, the lens diameter can be reduced in the second and third lens groups. Thus, the diameter of the lens barrel and the weight of the second lens group, which is moved during focusing, can be sufficiently reduced to provide a system that is suitable for inner focusing.

If the power of the first lens group is reduced such that the lower limit of condition (1) is not satisfied, the above-described advantage is not attainable. If, on the other hand, the power of the first lens group is increased to such an extent that the upper limit of condition (1) is exceeded, the first lens group experiences spherical aberrations and coma too great to be corrected.

If the power of the second lens group is reduced such that the lower limit of condition (2) is not satisfied, during focusing, the second lens group has to be moved such a large distance that it becomes difficult to insure an adequate back focus without unduly increasing the overall lens length. If the power of the second lens group is increased such that the upper limit of condition (2) is exceeded, large aberrations develop in the second lens group which increases aberrational variations during focusing, thereby preventing the lens system from maintaining satisfactory performance while shooting close-up objects.

In order to increase the back focus without unduly increasing the overall lens length, the individual lens elements and the stop mechanism must be positioned close to the object. However, this close element and mechanism positioning necessitates increasing the diameters of those lens elements and the diameter of the diaphragm, thereby increasing the weight of the overall system and the diameter of the lens barrel.

Under the above circumstances, the lens system of the present invention is so designed that the first lens group is composed of a first positive sub-group 1a and a second positive sub-group 1b. The second sub-group 1b has a weak positive power and is positioned next to the object side of the second lens group so as to reduce the diameter of an incident light beam. Thus, the diameter of the second lens group is reduced.

Condition (3) specifies the power of the second sub-group 1b. If the upper limit of this condition is exceeded, spherical aberrations and coma become too great to be corrected satisfactorily. If the power of the second sub-group 1b is not large enough to satisfy the lower limit of condition (3), the diameter of an incident light beam cannot be sufficiently reduced to decrease the diameter of the second lens group.

Condition (4) specifies the distance between first and second sub-groups 1a and 1b. If the distance between these two sub-groups decreases such that the lower limit of this condition is not satisfied, the powers of the individual lens elements in the first sub-group 1a will increase. Therefore, the lens elements in the first sub-group will experience aberrations too great to be effectively corrected. If the distance between the two sub-groups increases such that the upper limit of condition (4) is exceeded, the overall lens length will become excessive.

In the preferred embodiments, the third lens group comprises a third sub-group 3a composed of a negative meniscus lens element having a convex surface directed towards the image and a fourth sub-group 3b composed of a biconvex lens. The third lens group satisfies the following condition:

(5) $-1.0 < f/f_{3a} < -0.5$ where $f_{3a}$ is the focal length of the third sub-group 3a.

Condition (5) specifies the power of the third sub-group 3a. The third sub-group 3a is composed of a weak negative meniscus lens element having a convex surface directed towards the image. The third sub-group is responsible for correcting spherical aberration, curvature of the field and distortion. If the power of the third sub-group 3a increases such that the upper limit of condition (5) is exceeded, higher-order aberrations will develop. If the power of the third sub-group 3a decreases such that the lower limit of condition (5) is not satisfied, the third sub-group 3a is incapable of satisfactorily correcting aberrations.

In the preferred embodiments, the sub-group 1a comprises, in order from the object side, a positive lens element $L_1$, a positive meniscus lens element $L_2$ having a convex surface directed towards the object, a positive meniscus lens element $L_3$ having a convex surface directed towards the object, and a negative meniscus lens element $L_4$ having a convex surface directed towards the object. The sub-group 1b is composed of a single positive lens elements $L_5$. The second lens group 2 comprises a positive lens element $L_6$ cemented to a negative lens element $L_7$. The present lens system further satisfies the following condition:

(6) $0.5 < f_{1a}/r_{1b} < 2.5$ where $f_{1a}$ is the focal length of the first sub-group 1a and $r_{1b}$ is the radius of curvature of the surface of the lens element $L_5$ in the second sub-group 1b which is the closest to the object.

If the aforementioned conditions (1), (3) and (4) are satisfied, the overall lens length and the lens diameter remain small. The additional advantage of achieving more effective aberration correction is achieved if condition (6) is satisfied. If the radius of curvature $r_{1b}$ of the object-side surface of the lens element in the sub-group 1b is increased such that the lower limit of condition (6) is not satisfied, the power of that surface will become too small to allow reduction in the lens diameter of the second lens group. Furthermore, if the lower limit of condition (6) is not satisfied, the amount of positive spherical aberrations will increase. If, on the other hand, the radius of curvature $r_{1b}$ decreases such that the upper limit of condition (6) is exceeded, the negative spherical aberrations will increase thereby making it difficult to insure that the overall system will have satisfactory performance.

According to the present invention, the second lens group is moved toward the object to thereby focus the lens system on the object located on a shorter distance side.

EXAMPLE 1

Figure 1:
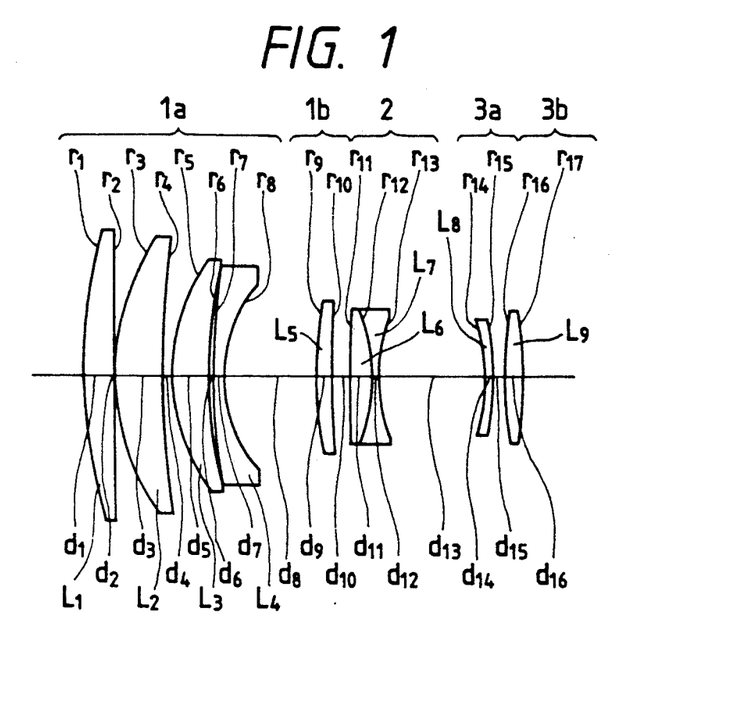
FIG. 1 is a simplified cross-sectional view of the telephoto lens system of Example 1, wherein the system is focused at infinity.
Figure 2:
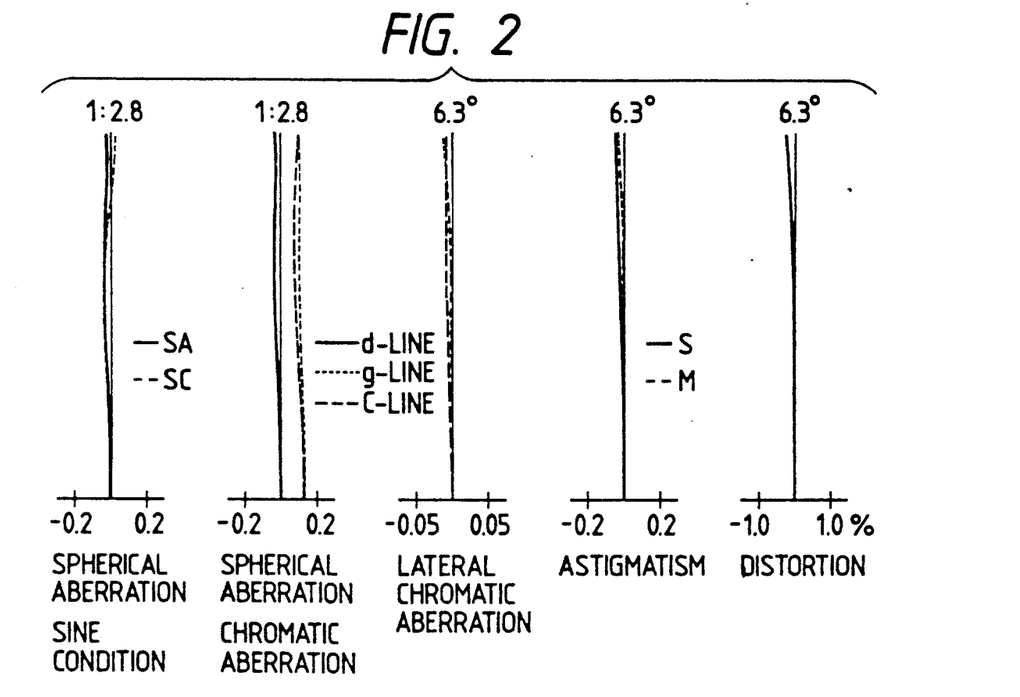
FIG. 2 is a set of graphs plotting the aberration curves obtained for the case shown in FIG. 1.
Figure 3:
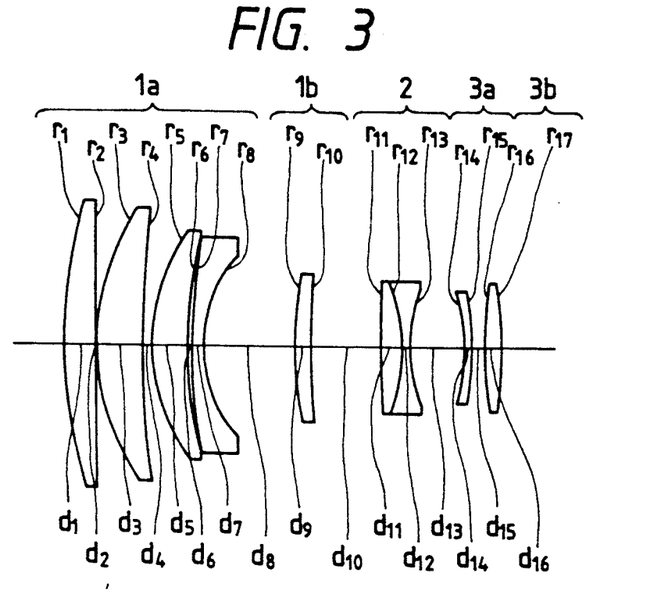
FIG. 3 is a simplified cross-sectional view of the telephoto lens system of Example 1, wherein the system is focused at the closest object distance.
Figure 4:
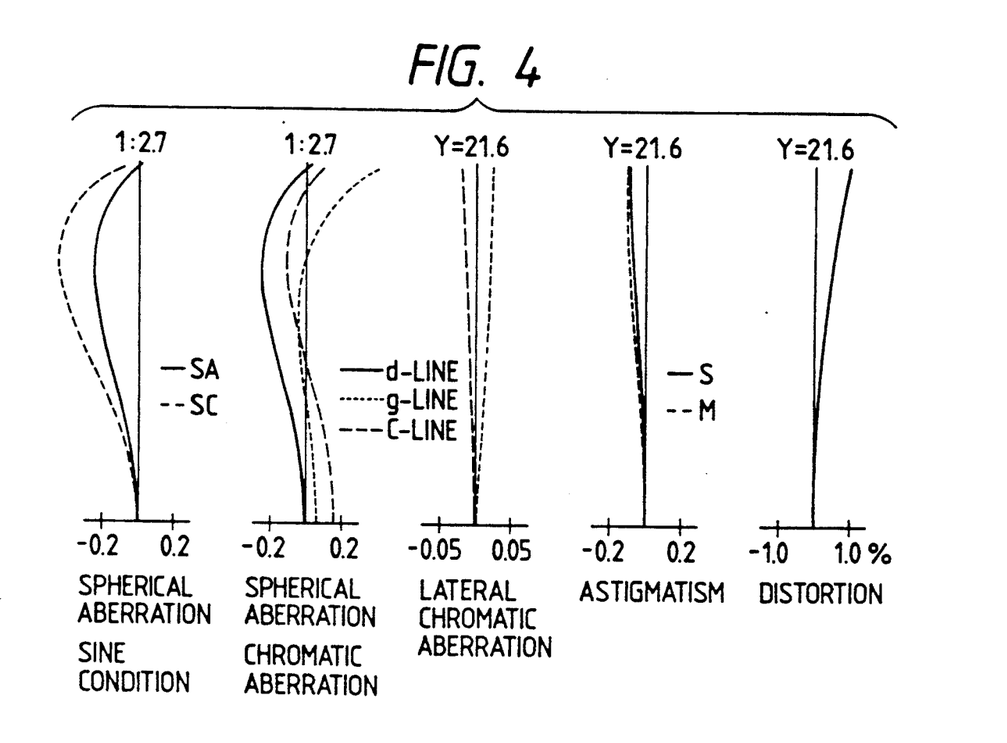
FIG. 4 is a set of graphs plotting the aberration curves obtained for the case shown in FIG. 3.

FIG. 1 is a simplified cross-sectional view of a first example of the present telephoto lens system, wherein the system is focused at infinity. FIG. 2 is a set of graphs plotting the aberration curves obtained from the lens system of FIG. 1. FIG. 3 is a simplified cross-sectional view of the same telephoto lens system, but with the system focused at the closest object distance (i.e. 1.4 m). FIG. 4 is a set of graphs plotting the aberration curves obtained from the lens system of FIG. 3.

The aberration curves illustrate the spherical aberration (SA), sine condition (SC), the chromatic aberrations represented by spherical aberrations at the d-, g- and c-lines, the lateral chromatic aberration, astigmatism (S, sagittal; M, meridional), and distortion. Specific data for the first example are shown in Tables 1 and 2, in which FNO. denotes the F number of an individual lens, f denotes the focal length, fB denotes the back focus, $\omega$ represents the half view angle, r represents the radius of curvature, d represents the lens thickness or the airspace between lenses, n denotes the refractive index at the d-line (588 nm), and $\nu$ represents the Abbe number.

TABLE 1

| Surface No. | r | d | n | $\nu$ |
|---|---|---|---|---|
| 1 | 115.283 | 7.51 | 1.48749 | 70.2 |
| 2 | 1503.159 | 0.20 | | |
| 3 | 54.297 | 11.71 | 1.49700 | 81.6 |
| 4 | 230.272 | 2.24 | | |
| 5 | 44.263 | 8.97 | 1.49700 | 81.6 |
| 6 | 99.345 | 1.48 | | |
| 7 | 168.332 | 2.50 | 1.60342 | 38.0 |
| 8 | 31.986 | 22.81 | | |
| 9 | 84.712 | 3.96 | 1.48749 | 70.2 |

TABLE 1-continued

| Surface No. | r | d | n | ν |
|---|---|---|---|---|
| 10 | 272.962 | variable | | |
| 11 | 1135.179 | 5.16 | 1.74950 | 35.3 |
| 12 | −40.470 | 2.00 | 1.70000 | 48.1 |
| 13 | 40.470 | variable | | |
| 14 | −46.838 | 2.00 | 1.78472 | 25.7 |
| 15 | −63.487 | 3.18 | | |
| 16 | 91.139 | 4.40 | 1.54814 | 45.8 |
| 17 | −91.139 | | | |

TABLE 2

| f | 195.00 | |
|---|---|---|
| fB | 67.50 | |
| fNo. | 1:2.8 | |
| ω | 6.3° | |
| d10 | 4.55 | 17.23 |
| d13 | 26.32 | 13.64 |

EXAMPLE 2

Figure 5:
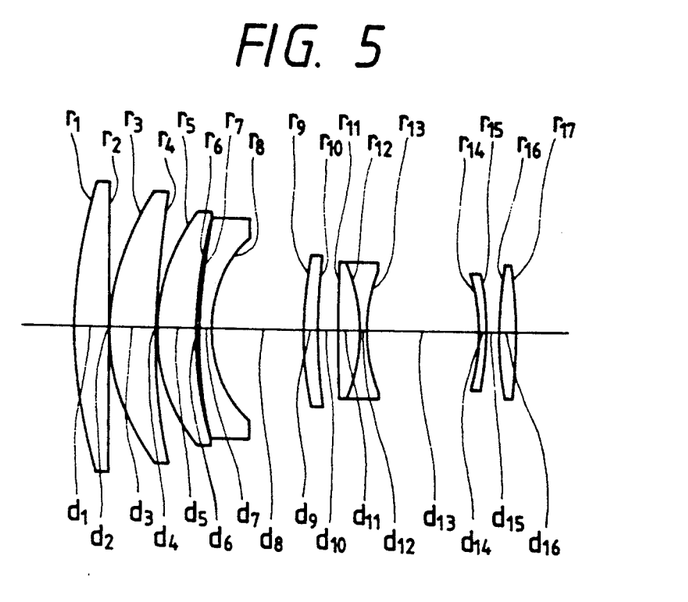
FIG. 5 is a simplified cross-sectional view of the telephoto lens system of Example 2, wherein the system is focused at infinity.
Figure 6:
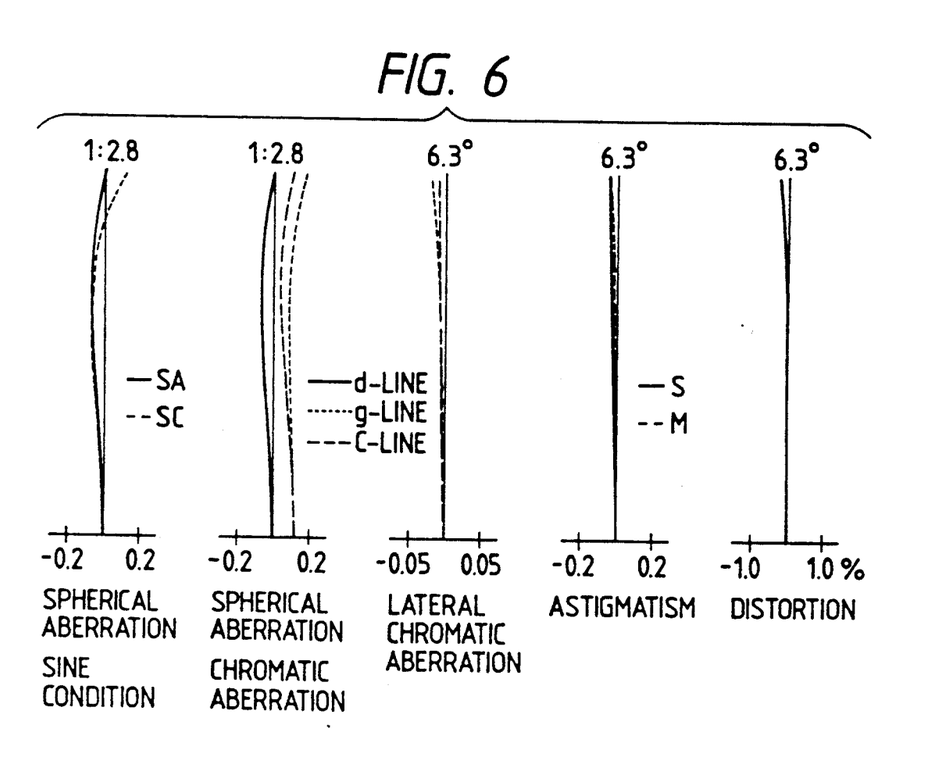
FIG. 6 is a set of graphs plotting the aberration curves obtained for the case shown in FIG. 5.
Figure 7:
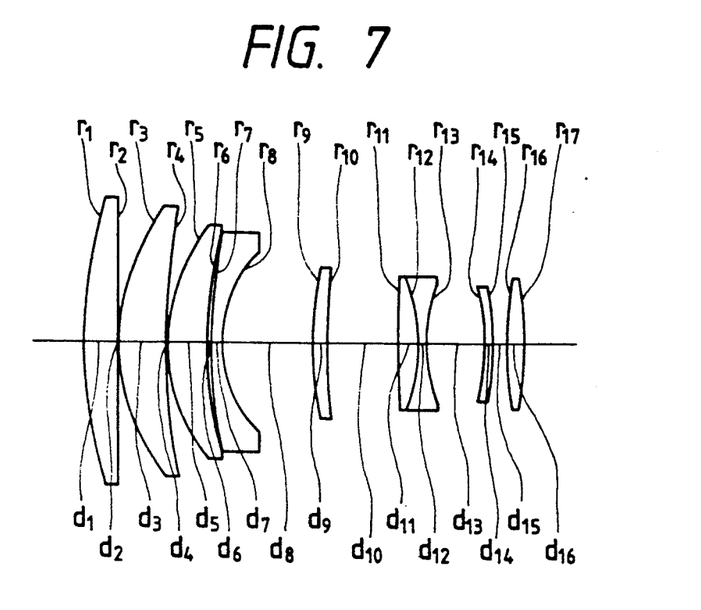
FIG. 7 is a simplified cross-sectional view of the telephoto lens system of Example 2, wherein the system is focused at the closest object distance.
Figure 8:
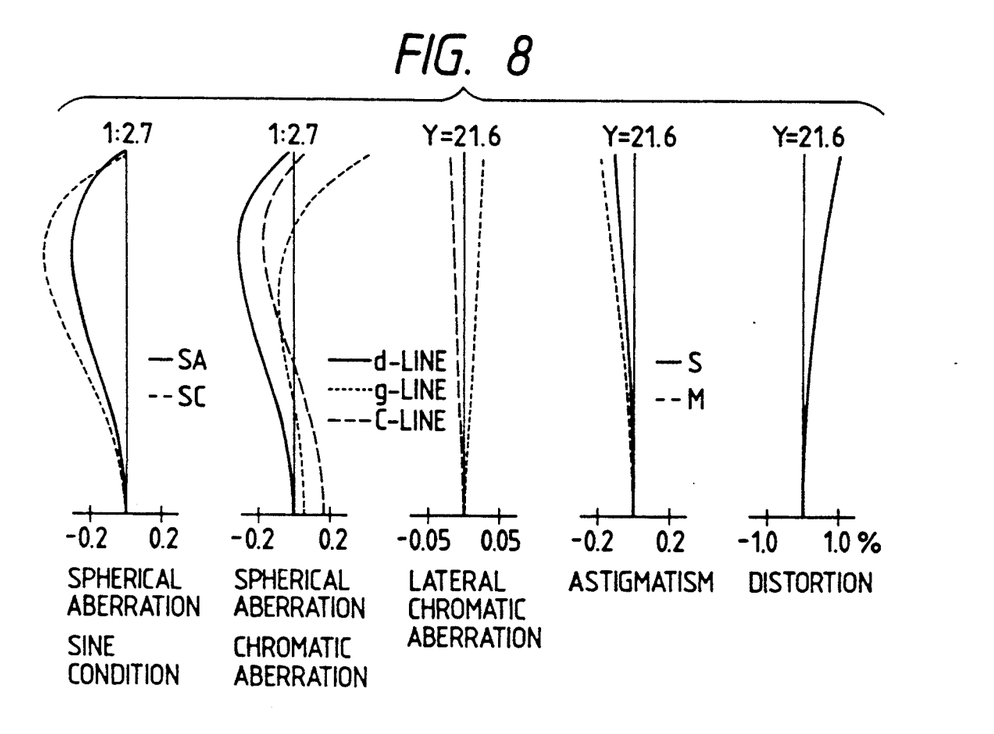
FIG. 8 is a set of graphs plotting the aberration curves obtained for the case shown in FIG. 7.

FIG. 5 is a simplified cross-sectional view of the second example of the present telephoto lens system, wherein the system is focused at infinity. FIG. 6 is a set of graphs plotting the aberration curves obtained from the system of FIG. 5. FIG. 7 is a simplified cross-sectional view of the same telephoto lens system, but with the system focused at the closest object distance (i.e., 1.4 m). FIG. 8 is a set of graphs plotting the aberration curves obtained from the system of FIG. 7. Specific data for this example are shown in Tables 3 and 4.

TABLE 3

| Surface No. | r | d | n | ν |
|---|---|---|---|---|
| 1 | 112.693 | 8.29 | 1.48749 | 70.2 |
| 2 | ∞ | 0.20 | | |
| 3 | 51.400 | 11.49 | 1.49700 | 81.6 |
| 4 | 168.593 | 0.30 | | |
| 5 | 43.195 | 9.43 | 1.49700 | 81.6 |
| 6 | 97.810 | 1.11 | | |
| 7 | 137.977 | 2.50 | 1.60342 | 38.0 |
| 8 | 30.398 | 22.44 | | |
| 9 | 83.330 | 3.69 | 1.48749 | 70.2 |
| 10 | 176.080 | variable | | |
| 11 | 3421.511 | 4.96 | 1.74950 | 35.3 |
| 12 | −42.110 | 2.00 | 1.70000 | 48.1 |
| 13 | 42.110 | variable | | |
| 14 | −47.092 | 2.00 | 1.77250 | 49.6 |
| 15 | −60.350 | 3.27 | | |
| 16 | 89.000 | 4.45 | 1.51112 | 60.5 |
| 17 | −89.000 | | | |

TABLE 4

| f | 194.90 | |
|---|---|---|
| fB | 67.56 | |
| fNo. | 1:2.8 | |
| ω | 6.3° | |
| d10 | 4.87 | 17.88 |
| d13 | 27.90 | 14.89 |

EXAMPLE 3

Figure 9:
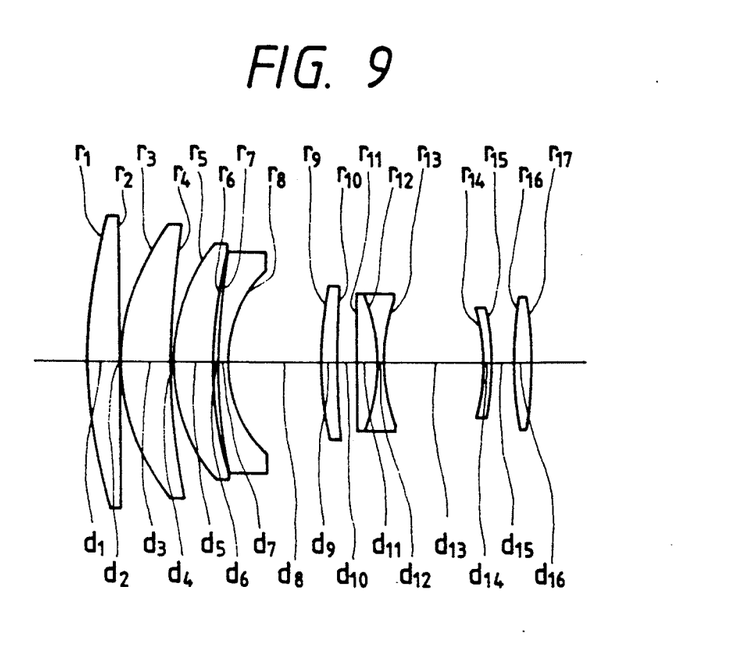
FIG. 9 is a simplified cross-sectional view of the telephoto lens system of Example 3, wherein the system is focused at infinity.
Figure 10:
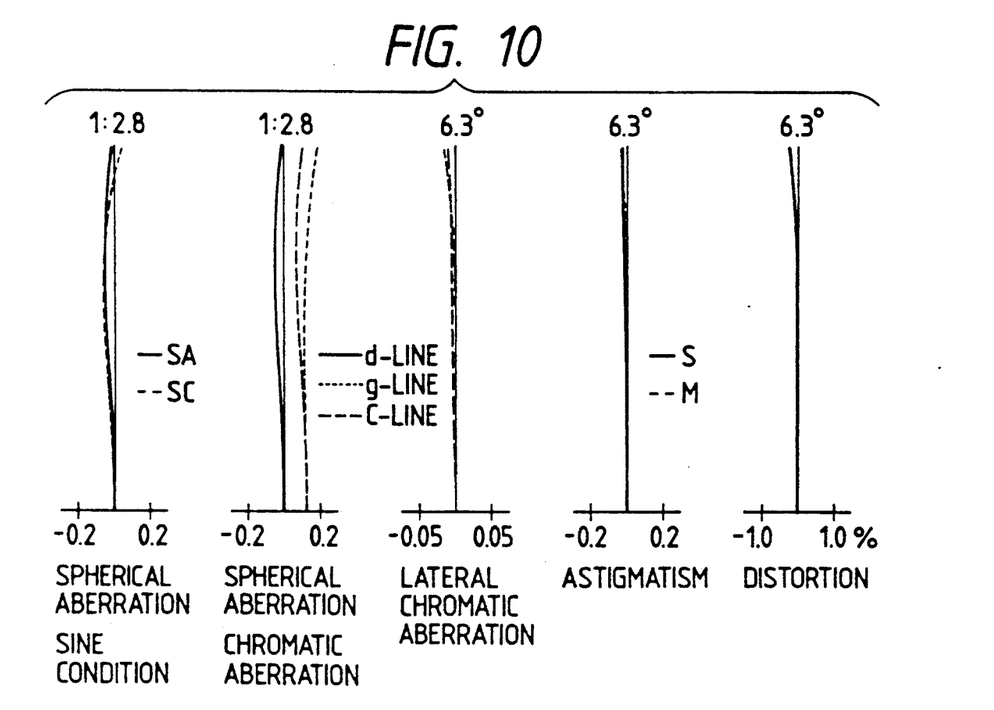
FIG. 10 is a set of graphs plotting the aberration curves obtained for the case shown in FIG. 9.
Figure 11:
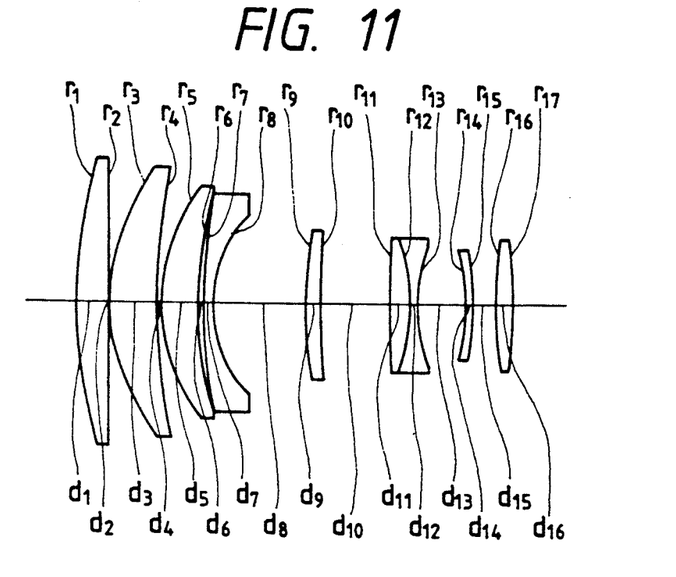
FIG. 11 is a simplified cross-sectional view of the telephoto lens system of Example 3, wherein the system is focused at the closest object distance.
Figure 12:
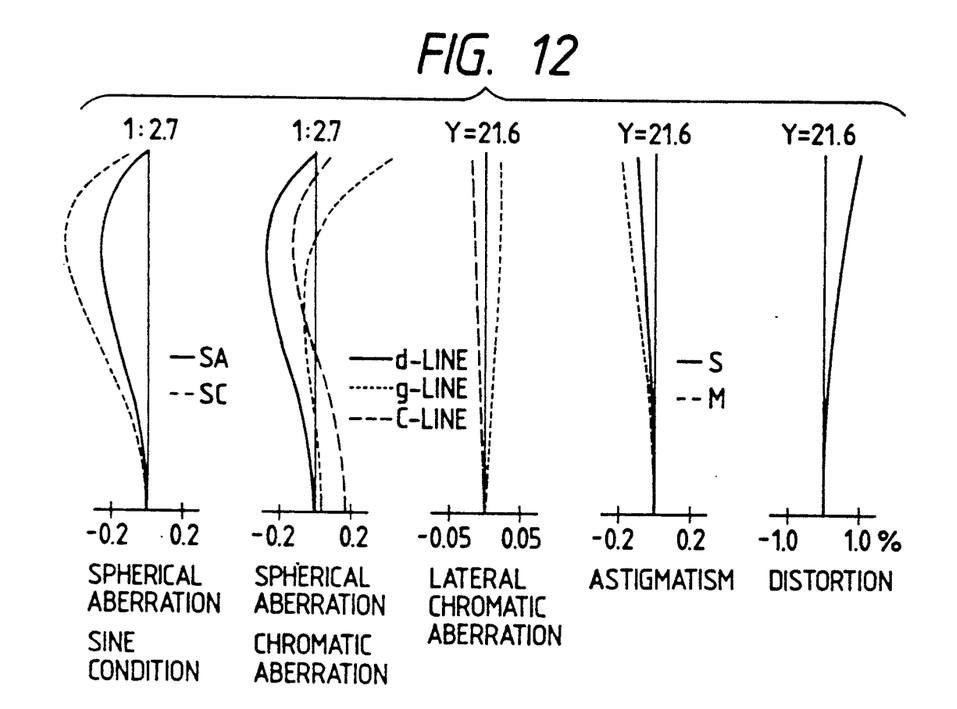
FIG. 12 is a set of graphs plotting the aberration curves obtained for the case shown in FIG. 11.

FIG. 9 is a simplified cross-sectional view of the third example of the present telephoto lens system, wherein the system is focused at infinity. FIG. 10 is a set of graphs plotting the aberration curves obtained from the system of FIG. 9. FIG. 11 is a simplified cross-sectional view of the same telephoto lens system, but with the system focused at the closest object distance (i.e., 1.4 m). FIG. 12 is a set of graphs plotting the aberration curves obtained from the system of FIG. 11. Specific data for this example are shown in Tables 5 and 6.

TABLE 5

| Surface No. | r | d | n | ν |
|---|---|---|---|---|
| 1 | 118.908 | 7.95 | 1.48749 | 70.2 |
| 2 | −2636.865 | 0.20 | | |
| 3 | 51.123 | 11.52 | 1.49700 | 81.6 |
| 4 | 164.776 | 0.93 | | |
| 5 | 43.350 | 9.06 | 1.49700 | 81.6 |
| 6 | 91.353 | 1.32 | | |
| 7 | 136.230 | 2.50 | 1.60342 | 38.0 |
| 8 | 30.814 | 22.85 | | |
| 9 | 85.131 | 3.82 | 1.48749 | 70.2 |
| 10 | 221.111 | variable | | |
| 11 | 1222.499 | 5.08 | 1.74950 | 35.3 |
| 12 | −41.415 | 2.00 | 1.70000 | 48.1 |
| 13 | 41.415 | variable | | |
| 14 | −45.697 | 2.00 | 1.80518 | 25.4 |
| 15 | −60.076 | 5.67 | | |
| 16 | 92.618 | 4.43 | 1.54072 | 47.2 |
| 17 | −92.618 | | | |

TABLE 6

| f | 194.99 | |
|---|---|---|
| fB | 67.50 | |
| FNo. | 1:2.8 | |
| ω | 6.3° | |
| d10 | 4.68 | 17.60 |
| d13 | 25.00 | 12.08 |

Table 7 shows values that satisfy the conditions (1) to (6) in Examples 1 to 3.

TABLE 7

| Condition | Ex. 1 | Ex. 2 | Ex. 3 |
|---|---|---|---|
| (1) f/f$_1$ | 1.719 | 1.697 | 1.710 |
| (2) f/f$_2$ | −2.992 | −2.961 | −2.931 |
| (3) f/f$_{1b}$ | 0.779 | 0.608 | 0.693 |
| (4) d$_{1ab}$/f$_1$ | 0.201 | 0.195 | 0.200 |
| (5) f/f$_{3a}$ | −0.811 | −0.656 | −0.771 |
| (6) f$_{1a}$/r$_{1b}$ | 1.763 | 1.708 | 1.710 |

As described above, the present invention provides a bright telephoto lens system that has a comparatively long back focus without unduly increasing the overall lens length and lens diameter. If conditions (1) to (6) are satisfied, a high-performance telephoto lens system can be produced with various aberrations being corrected in a satisfactory manner.

What is claimed is:

1. In a telephoto lens system that comprises, in order from the object side, a positive first lens group, a negative second lens group and a positive third lens group and which is focused by moving said second lens group, the improvement wherein said first lens group comprises a positive sub-group 1a and a positive sub-group 1b distant therefrom by airspace, and satisfies the following conditions:

(1) $1.4 < f/f_1 < 2.0$ (2) $-3.5 < f/f_2 < -2.5$ (3) $0.4 < f/f_{1b} < 1.0$ (4) $0.1 < d_{1ab}/f_1 < 0.3$ where
f: the focal length of the overall system;
f$_1$: the focal length of the first lens group;
f$_2$: the focal length of the second lens group;

$f_{1b}$: the focal length of the sub-group $1b$; and $d_{1ab}$: the distance between the sub-groups $1a$ and $1b$.

2. A telephoto lens system according to claim 1 wherein said third lens group comprises a sub-group $3a$ composed of a negative meniscus lens element having a convex surface directed towards the image and a sub-group $3b$ composed of a biconvex lens, and satisfies the following conditions (5) $-1.0 < f/f_{3a} < -0.5$ where $f_{3a}$: the focal length of the sub-group $3a$.

3. A telephoto lens system according to claim 1, wherein said sub-group $1a$ comprises, in order from the object side, a positive lens element 1-1, a positive meniscus lens element 1-2 having a convex surface directed towards the object, a positive meniscus lens element 1-3 having a convex surface directed towards the object, and a negative meniscus lens element 1-4 having a convex surface directed towards the object, said sub-group $1b$ being composed of a single positive lens element, said second lens group comprising a positive lens element 2-1 cemented to a negative lens element 2-2, said lens system further satisfying the following condition:

(6) $0.5 < f_{1a}/r_{1b} < 2.5$ where $f_{1a}$: the focal length of the sub-group $1a$; and $r_{1b}$: the radius of curvature of the surface of the sub-group $1b$ which is the closest to the object.

4. A telephoto lens system comprising in order from an object side, a positive first lens group, a negative second lens group and a positive third lens group, said system being focused by moving said second lens group, said first lens group having positive first and second sub-groups separate by an air gap, said system satisfying the following conditions:

$1.4 < f/f_1 < 2.0$ and $-3.5 < f/f_2 < -2.5$ where f is a focal length of an overall system; $f_1$ is a focal length of the first lens group; and $f_2$ is a focal length of the second lens group.

5. A telephoto lens system according to claim 4 wherein said third lens group comprises a third sub-group comprising a negative meniscus lens element having a convex surface directed towards the image side an a fourth sub-group comprising a biconvex lens element, and satisfies the following condition:

$-1.9 < f/f_{3a} < -0.5$ where $f_{3a}$ is a focal length of the third sub-group.

6. A telephoto lens system according to claim 4, wherein said first sub-group comprises, in order from the object side, a positive first lens element, a positive meniscus second lens element having a convex surface directed toward the object side, a positive meniscus third lens element having a convex surface directed toward the object side, and a negative meniscus fourth lens element having a convex surface directed toward the object side, said second sub-group comprising a single positive fifth lens element, said second lens group comprising a positive sixth lens element cemented to a negative seventh lens element, said lens system further satisfying the following condition:

$0.5 < f_{1a}/r_{1b} < 2.5$ where $f_{1a}$ is a focal length of the first sub-group; and $r_{1b}$ is a radius of curvature of an object side surface of the fifth lens element in the second sub-group.

7. A telephoto lens system comprising in order from an object side, a positive first lens group, a negative second lens group and a positive third lens group, said system being focused by moving said second lens group, said first lens group having positive first and second sub-groups separate by an air gap, said system satisfying the following conditions:

$0.4 < f/f_{1b} < 1.0$ $0.1 < d_{1ab}/f_1 < 0.3$ where f is a focal length of an overall system; $f_{1b}$ is the focal length of the second sub-group; and $d_{1ab}$ is the distance between the first and second sub-groups.

8. A telephoto lens system according to claim 7 wherein said third lens group comprises a third sub-group comprising a negative meniscus lens element having a convex surface directed towards the image side and a fourth sub-group comprising a biconvex lens element, and satisfies the following condition:

$-1.0 < f/f_{3a} < -0.5$ where $f_{3a}$ is a focal length of the third sub-group.

9. A telephoto lens system according to claim 7, wherein said first sub-group comprises, in order from the object side, a positive first lens element, a positive meniscus second lens element having a convex surface directed toward the object side, a positive meniscus third lens element having a convex surface directed toward the object side, and a negative meniscus fourth lens element having a convex surface directed toward the object side, said second sub-group comprising a single positive fifth lens element, said second lens group comprising a positive sixth lens element cemented to a negative seventh lens element, said lens system further satisfying the following condition:

$0.5 < f_{1a}/r_{1b} < 2.5$ where $f_{1a}$ is a focal length of the first sub-group; and $r_{1b}$ is a radius of curvature of an object side surface of the fifth lens element in the second sub-group.

* * * * *